(12) United States Patent
Marx et al.

(10) Patent No.: US 9,744,982 B2
(45) Date of Patent: Aug. 29, 2017

(54) STEERING LOCK DEVICE FOR A MOTOR VEHICLE

(71) Applicant: Nissan Motor Co., Ltd., Kanagawa (JP)

(72) Inventors: Thilo Marx, Villingen-Schwenningen (DE); Damien Vagney, Villingen-Schwenningen (DE); Hubert Willmann, Bräunlingen (DE); Kenjirou Hayashi, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 33 days.

(21) Appl. No.: 14/772,291

(22) PCT Filed: Mar. 4, 2013

(86) PCT No.: PCT/EP2013/000617
§ 371 (c)(1),
(2) Date: Sep. 2, 2015

(87) PCT Pub. No.: WO2014/135172
PCT Pub. Date: Sep. 12, 2014

(65) Prior Publication Data
US 2016/0001808 A1  Jan. 7, 2016

(51) Int. Cl.
*B62D 1/184* (2006.01)
*B60R 25/0215* (2013.01)

(52) U.S. Cl.
CPC ........ *B62D 1/184* (2013.01); *B60R 25/02153* (2013.01)

(58) Field of Classification Search
CPC .......................... B62D 1/184; B60R 25/02153
See application file for complete search history.

(56) References Cited

U.S. PATENT DOCUMENTS

| | | | |
|---|---|---|---|
| 8,424,348 B2* | 4/2013 | Dimig | B60R 25/00 70/182 |
| 9,457,833 B2* | 10/2016 | Dimig | B60R 25/0215 |
| 2014/0150503 A1* | 6/2014 | Gweon | B60R 25/02115 70/183 |

(Continued)

FOREIGN PATENT DOCUMENTS

| | | | | |
|---|---|---|---|---|
| DE | 10017032 A1 * | 10/2001 | ....... | B60R 25/02153 |
| DE | 10 2006 057356 A1 | 6/2008 | | |
| WO | 2011/104017 A1 | 9/2011 | | |

*Primary Examiner* — Faye M Fleming
(74) *Attorney, Agent, or Firm* — Osha Liang LLP

(57) ABSTRACT

A locking device for a motor vehicle having a steering column has a blocking bolt that locks the steering wheel shaft in the steering wheel column, wherein the blocking bolt is movable between a first and a second position, a return element that returns the blocking bolt to the first position, and at least one protection cover that at least partially covers the return element. In the first position, the blocking bolt is in blocking engagement with the steering wheel shaft. In the second position, the blocking bolt is disengaged from the steering wheel shaft. The return element is a torsion spring. The torsion spring is a coil spring with a coil body and a connection hook. A first end portion of the torsion spring has a hook extension, and is inserted into an opening of the blocking bolt and is covered at least partially by the blocking bolt.

11 Claims, 4 Drawing Sheets

(56) References Cited

U.S. PATENT DOCUMENTS

2016/0075367 A1\* 3/2016 Sakuda .................. B62D 1/185
 74/493
2016/0214640 A1\* 7/2016 Sakuda .................. B62D 1/184
2016/0288820 A1\* 10/2016 Myohoji ................ B62D 1/195
2016/0288821 A1\* 10/2016 Sakuda .................. B62D 1/184

\* cited by examiner

STEERING LOCK DEVICE FOR A MOTOR VEHICLE

BACKGROUND

Technical Field

The invention relates to a locking device for a motor vehicle.

Related Art

Locking devices for locking of a steering wheel column of a vehicle are well known in the prior art. In the WO 2011/104017 A1 such a locking device is disclosed. In this locking device a blocking bolt is movable between a first and a second position for locking the steering wheel shaft in the steering wheel column. In the first position the blocking bolt can be brought into blocking engagement with the steering wheel shaft and, in the second position, is disengaged from the steering wheel shaft. The locking device furthermore has a drive, which is located in a housing, for moving the blocking bolt. The blocking bolt is part of the steering wheel column and is integrated in particular in the steering wheel column.

SUMMARY

A conventional locking device may be susceptible to theft. Since the blocking bolt is engaged into the steering wheel shaft by a spring the disengagement of the blocking bolt may be easy to achieve by destroying the spring.

According to one or more embodiments of the present invention, a steering lock device for a motor vehicle includes a better security against theft.

According to one or more embodiments of the invention, a return element, which presses the blocking bolt into the blocked position, is at least partially covered by at least one protection cover.

By covering the return element this element is less accessible to thieves than conventional devices, or totally inaccessible for thieves. For this reason it is more difficult to destroy the return element with the intention to disengage the blocking bolt from the steering shaft. So a vehicle having such a locking device is better secured against thieves.

In one or more embodiments of the invention, a drive with transmission element is provided to move the blocking bolt from the first to the second position, wherein the transmission element comprise a protection cover to cover the return element at least partially. In one or more embodiments of present invention, the effort for realizing a protection cover is increased, because the protection cover can be realized with a double function element, which belongs to the transmitting element and is simultaneously realizing a transmission and a protection function.

According to one or more embodiments of the present invention, a transmission element comprises a pivotable arm as transmission element and as protection cover, which covers the return element at least partially. Since a pivotable arm as part of transmission element for operating the blocking bolt is usually built very robust it can be used in an appropriate arrangement as solid protection cover preventing the return element from violent destruction.

According to one or more embodiments of the present invention, the return element is a torsion spring. A torsion spring is an effective way to realize a reliable return element with low costs. Furthermore a torsion spring allows to be covered at least partially by a transmission arm.

According to one or more embodiments of the present invention, the torsion spring is a coil spring with a coil body and a connection hook. This configuration constitutes a compact form in the area of the coil body and allows a longitudinal extension to an appropriate place, where the return force of the torsion spring should be coupled to the blocking bolt and/or a corresponding fix point to fix an end portion of the torsion spring.

According to one or more embodiments of the present invention, at least one additional protection cover is provided to cover the coil body at least partially. Since the coil body of a spring has a compact form in contrast to the longitudinal end portions like a connection hook it is advantageous to cover different parts of the torsion spring with different protection covers.

Accordingly, the cover for the coil spring can have a corresponding compact form adapted to the coil body and a longitudinal end portion like a connection hook can be covered by a longitudinal element like a transmission arm.

According to one or more embodiments of the invention, the additional protection cover is formed in a frame of the steering wheel column. So the coil body is protected in a very safe manner thereupon no additional separate part has to be manufactured.

According to one or more embodiments of the present invention, an end portion of the coil spring has a hook extension projecting from the coil body to the blocking bolt and is covered at least partially by the pivotable arm. With this combination of features the coil spring is connected to the blocking bolt assuring the safe engagement of the blocking bolt in the steering wheel column when no active disengagement is driven by the drive of the transmission element. At the same time the hook extension of the coil spring is covered by the pivotable arm and protected against violent destructions.

According to one or more embodiments of the present invention, the hook extension as a first end portion of the torsion spring is inserted to an opening of blocking bolt and covered at least partially by the blocking bolt. This construction gives a safe mechanical coupling of the coil spring to the blocking bolt, wherein the first end of the hook extension is secured against undesired access from outside.

According to one or more embodiments of the present invention, the pivotable arm covers at least partially a guiding and holding element for the blocking bolt. In this arrangement the pivotable arm can operate the blocking bolt for disengagement from the steering wheel shaft or from the groove collar of the steering wheel shaft. At the same time the pivotable arm protects the blocking bolt against undesired removal out of the guiding and holding element.

If the guiding and holding element is a hollow profile formed in the frame of steering wheel column, there is no separate guiding and holding element necessary. Furthermore such a guiding and holding element formed in the frame is very difficult to destroy violently In one or more embodiments of the invention, the blocking bolt is secured in the hollow profile building the guiding and holding element and protected by a corresponding protection cover, in example by the pivotable arm.

According to one or more embodiments of the present invention, a second end portion of the torsion spring extents from the coil body into an opening of a central holding pin formed in the frame of the steering wheel column. In this way a second end portion of the torsion spring is fixed at the frame of the steering wheel column, wherein the point of fixing is not accessible from outside and therefore protected against violation.

According to one or more embodiments of the present invention, the protection cover for the return element is realized by the transmission arm and at least one additional protection cover, which surrounds the return element at least partially.

According to one or more embodiments of the present invention, further increase of safety may be accomplished, if the blocking bolt has a recess in which the pivotable arm is arranged. By this arrangement the blocking bolt is secured by the pivotable arm against a removal out of the guiding and holding element.

According to one or more embodiments of the present invention, the guiding and the holding element has a recess in which the pivotable arm is arranged. In this arrangement not only the blocking bolt is secured in the guiding and holding element but further the transmission arm, which can be removed from the guiding and holding element in only in one direction of movement. So it is facilitated to secure the transmission arm at the frame.

DETAILED DESCRIPTION

Embodiments of the invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
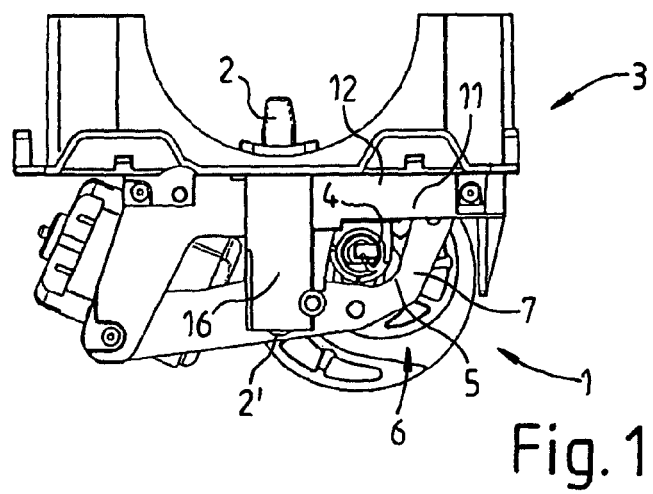
FIG. 1 is showing a side view to a locking device according to one or more embodiments of the present invention in the first, locked position of the blocking bolt.
Figure 2:
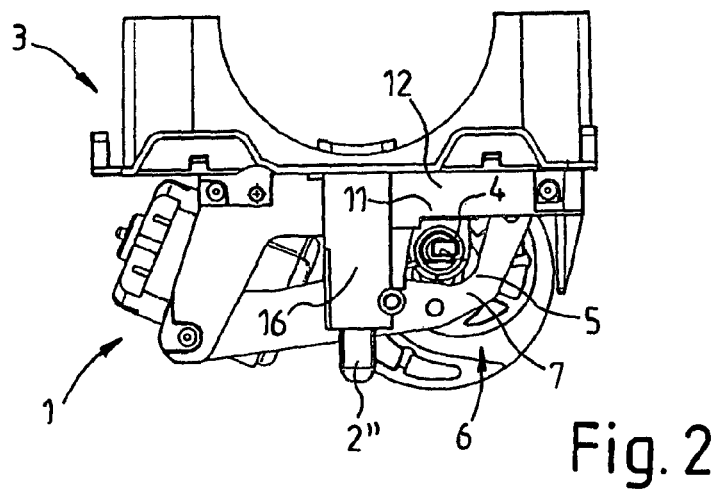
FIG. 2 shows the device according to FIG. 1 in the unlocked second position of the blocking bolt.
Figure 3:
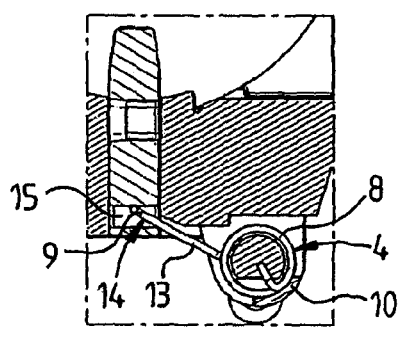
FIG. 3 shows an extract of the arrangement of return element and blocking bolt in the frame of the device in the locked, first position of the blocking bolt in a sectional representation.
Figure 4:
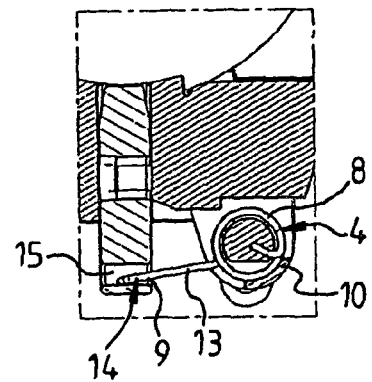
FIG. 4 shows the extract of FIG. 3 in the unlocked, second position of the blocking bolt.

The locking device 1 of FIGS. 1 and 2 has a blocking bolt 2, which is able to engage to a steering wheel shaft or its groove collar in a steering wheel column in a first position 2' (FIG. 1) and to disengage in a second position 2" (FIG. 2).

A return element 4 in form of a coil spring is covered by a protection cover 5, built by a transmission element 6, especially by the pivotable arm 7.

A first additional protection cover 10 covers a spring coil partially. A second additional protection cover 11 covers the return element 4 on the side faced to the steering wheel column 3 (see FIGS. 1 and 2). The additional protection covers 10 arid 11 are built or formed in a frame 12 of the locking device 1.

A hook extension 13 extents from the coil body 8 ending in an end portion 14 in an opening 15 of the blocking bolt 2. The blocking bolt 2 is guided and held in a guiding and holding element 16 between the blocked position 2' (FIG. 1) and 2" (FIG. 2).

Figure 5:
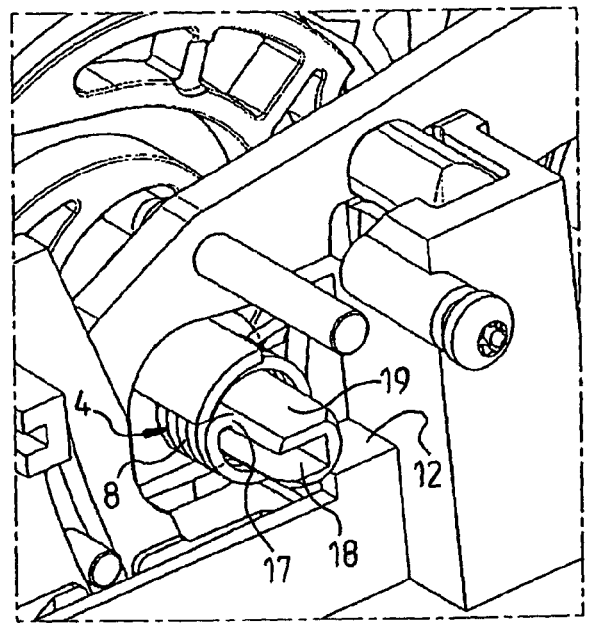
FIG. 5 is showing a perspective view to a part of the locking device illustrating the arrangement of the pivotable arm as protection cover.
Figure 6:
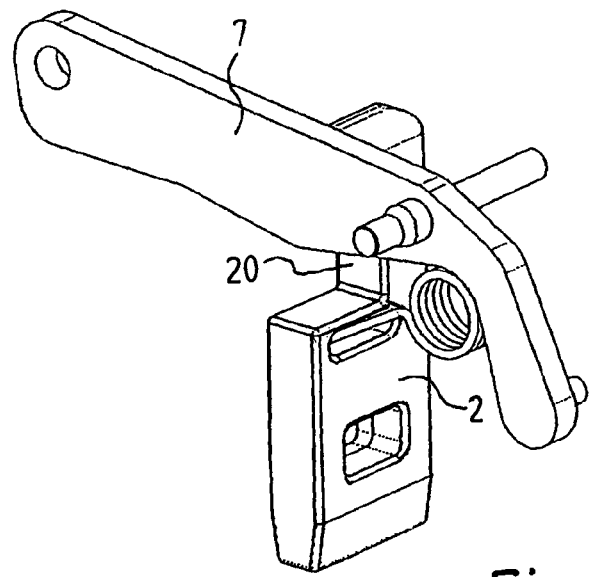
FIGS. 6 and 7 are showing the arrangement of the pivotable arm, the return element and the blocking bolt in two difference viewing directions.
Figure 7:
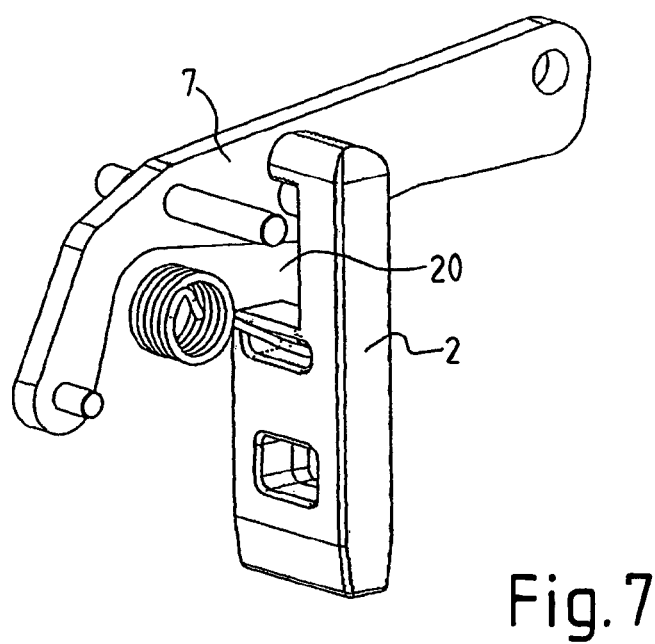

The coil body 8 is provided with a second end portion 17 extending into an opening 18 of a holding pin 19 (see FIG. 5).

Figure 8:
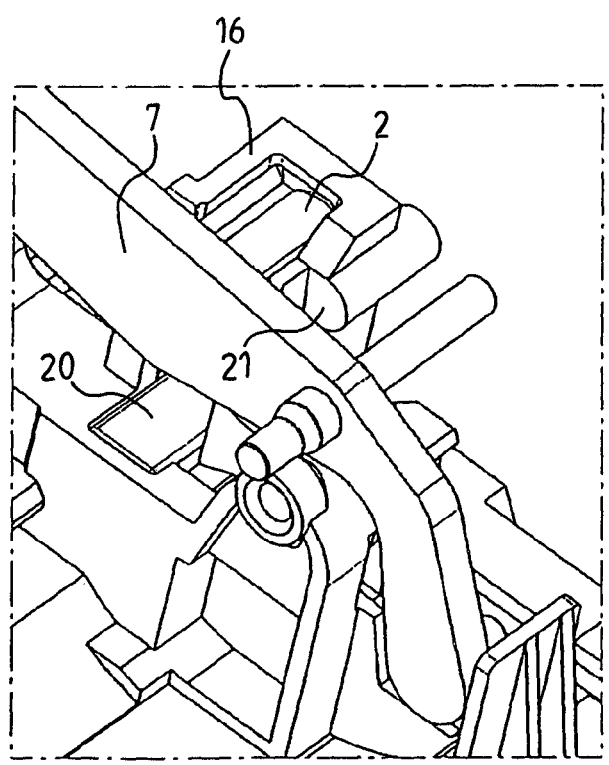
FIG. 8 is showing a further perspective detail and FIGS. 9a and 9b are showing one or more embodiments of the present invention in perspective view.

The blocking bolt 2 as well as the guiding and holding element 16 has a recess 20, 21, which is covered by the pivotable arm 7 (see FIG. 8).

Figure 9:
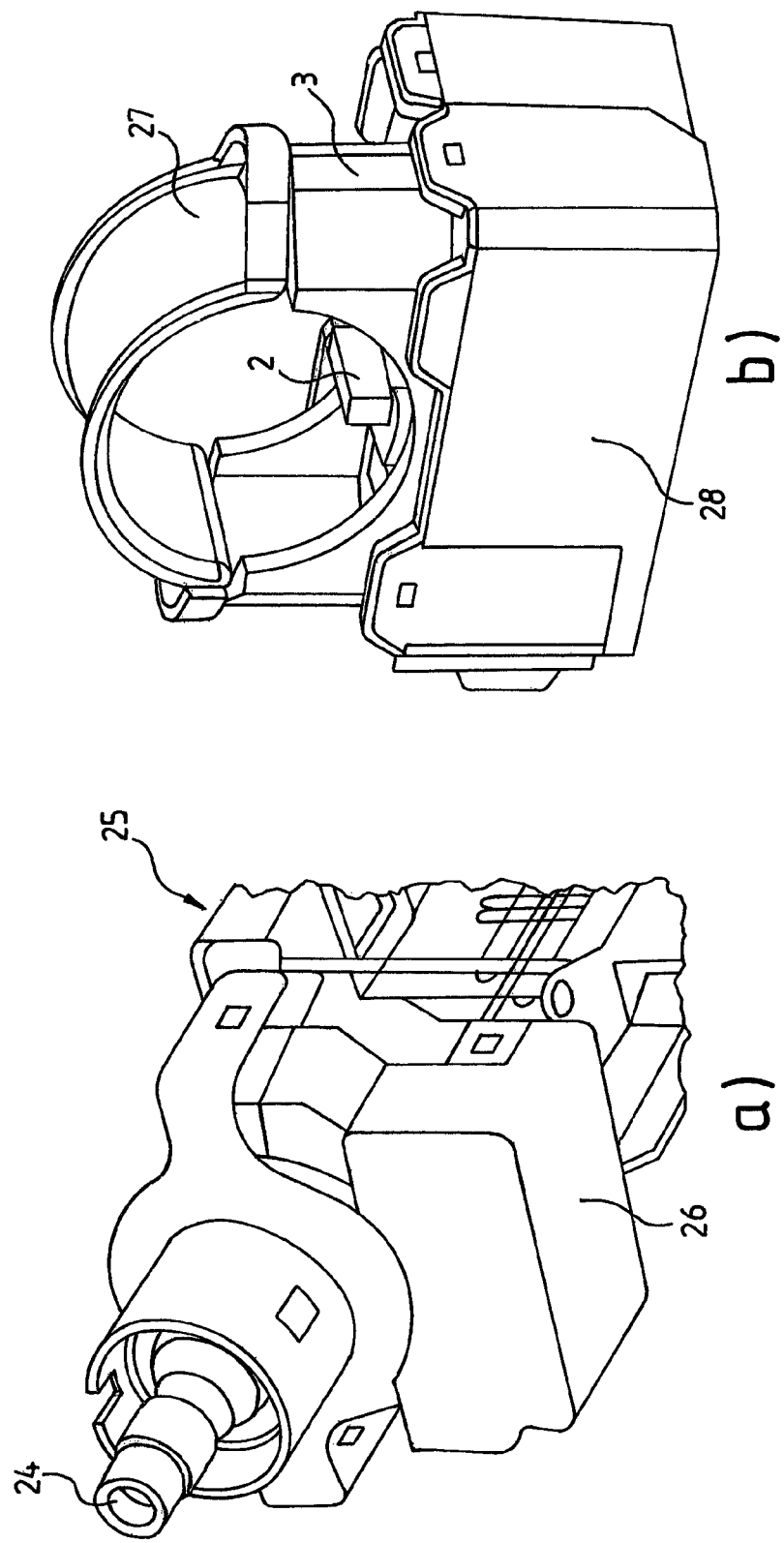

FIG. 9a is a schematic view of one or more embodiments of the invention. The steering lock device is fixed to a steering column 25 with a bolted clump 27. Steering lock device is partly covered with a trim cover 26 formed by plastic. The trim cover 26 is fixed to a housing 28 with clicks (not shown) and removable from the housing 28 with their elasticity shown in FIG. 9b.

The steering lock device has a blocking bolt 2 that forms locking condition and unlocked condition. The bolt is inserted to a channel (not shown) of a steering shaft 24 when it forms locking condition.

In one or more embodiments of the present invention, the pivotable arm 7 is fixed at a worm wheel 22 which is driven by worm 23 and a motor (not shown). Driven in clockwise direction by the worm wheel 22 the pivotable arm 7 is spaced apart the frame 12 of the steering wheel column. The end positions of the pivotable arms 7 and the worm wheel 22 are shown in FIGS. 1 and 2.

The pivotable arm 7 is coupled with the blocking bolt 2 and moves the coupled blocking bolt 2 from the locked position 2' into the unlocked, disengaged position 2".

The blocking bolt 2 is able to move into the locked position 2' forced by the return element 4, i.e., the coil spring 8. The steering shaft of the steering column is locked by the blocking bolt, which is pushed by the spring into locking direction.

In unlocking direction the blocking bolt is pulled by the electromechanical system described above. The spring-loaded bearing of the blocking bolt in locking direction is important, because a blocking bolt could be on top or ground of the tooth collar of the steering column. The steering column is locked by the blocking bolt, which is pushed by the spring into locking direction.

The locking of the steering column in the prior art could be destroyed by removing or destroying the spring. According to one or more embodiments of the invention, the electronic steering column lock is protected against any thief attack by covering the return element 4, i.e. the spring 8 at least partially by at least one protection cover 5. In one or more embodiments of the present invention, the transmission element provided to move the blocking bolt 2 comprise such a protection cover to cover the return element. For this reason a complete cover of the electronic steering column 3 i. e. made of metal is disposable without any loss of security.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 locking device
2 blocking bolt
2' first position
2" second position 3 steering column
4 return element
5 protection cover
6 transmission means element
7 pivotable arm
8 coil body
9 connection hook
10 additional protection cover
11 additional protection cover
12 frame
13 hook extension
14 first end portion
15 opening of blocking bolt
16 guiding and holding element
17 second end portion
18 opening
19 central holding pin
20 recess
21 recess
22 worm wheel
23 worm
24 steering shaft
25 steering column body
26 trim cover
27 bolted clump
28 housing

The invention claimed is:

1. A locking device for a motor vehicle having a steering wheel column, comprising:
 a blocking bolt that locks a steering wheel shaft in the steering wheel column, wherein the blocking bolt is movable between a first and a second position;
 a return element that returns the blocking bolt to the first position; and
 at least one protection cover that at least partially covers the return element,
 wherein, in the first position, the blocking bolt is in blocking engagement with the steering wheel shaft,
 wherein, in the second position, the blocking bolt is disengaged from the steering wheel shaft,
 wherein the return element is a torsion spring,
 wherein the torsion spring is a coil spring with a coil body and a connection hook,
 wherein a first end portion of the torsion spring has a hook extension, and is inserted into an opening of the blocking bolt and is covered at least partially by the blocking bolt, and
 wherein a second end portion of the torsion spring extends from the coil body into an opening of a central holding pin formed in a frame of the steering wheel column.

2. The locking device according to claim 1,
 wherein a drive with transmission element is provided to move the blocking bolt from the first to the second position, and
 wherein the transmission element comprises the protection cover.

3. The locking device according to claim 1,
 wherein the transmission element comprises a pivotable arm and the protection cover.

4. A locking device for a motor vehicle having a steering wheel column, comprising:
 a blocking bolt that locks a steering wheel shaft in the steering wheel column, wherein the blocking bolt is movable between a first and a second position;
 a return element that returns the blocking bolt to the first position; and
 at least one protection cover that at least partially covers the return element,
 wherein, in the first position, the blocking bolt is in blocking engagement with the steering wheel shaft,
 wherein, in the second position, the blocking bolt is disengaged from the steering wheel shaft,
 wherein the return element is a torsion spring,
 wherein the torsion spring is a coil spring with a coil body and a connection hook,
 wherein a first end portion of the torsion spring has a hook extension, and is inserted into an opening of the blocking bolt and is covered at least partially by the blocking bolt,
 wherein a second end portion of the torsion spring extends from the coil body into an opening of a central holding pin formed in a frame of the steering wheel column, and
 wherein at least one additional protection cover is provided to cover the coil body at least partially.

5. A locking device for a motor vehicle having a steering wheel column, comprising:
 a blocking bolt that locks a steering wheel shaft in the steering wheel column, wherein the blocking bolt is movable between a first and a second position;
 a return element that returns the blocking bolt to the first position; and
 at least one protection cover that at least partially covers the return element,
 wherein, in the first position, the blocking bolt is in blocking engagement with the steering wheel shaft,
 wherein, in the second position, the blocking bolt is disengaged from the steering wheel shaft,
 wherein the return element is a torsion spring,
 wherein the torsion spring is a coil spring with a coil body and a connection hook,
 wherein a first end portion of the torsion spring has a hook extension, and is inserted into an opening of the blocking bolt and is covered at least partially by the blocking bolt,
 wherein a second end portion of the torsion spring extends from the coil body into an opening of a central holding pin formed in a frame of the steering wheel column, and
 the additional protection cover is formed in the frame of the steering wheel column.

6. The locking device according to claim 3,
 wherein the connection hook of the coil spring comprises the hook extension projecting from the coil body to the blocking bolt and covered at least partially by the pivotable arm.

7. The locking device according to claim 3,
 wherein the pivotable arm covers at least partially a guiding and holding element that guides and holds the blocking bolt.

8. The locking device according to claim 7,
 wherein the guiding and holding element is a hollow profile formed in the frame of the steering wheel column.

9. The locking device according to claim 3,
 wherein the pivotable arm and at least one additional protection cover surround and protect the return element.

10. The locking device according to claim 3,
 wherein the blocking bolt has a recess in which the pivotable arm is disposed.

11. The locking device according to claim 3, further comprising:

a guiding and holding element that guides and holds the blocking bolt,
wherein the guiding and the holding element has a recess in which the pivotable arm is disposed.

\* \* \* \* \*